(12) United States Patent
Lehmann et al.

(10) Patent No.: US 8,387,413 B2
(45) Date of Patent: Mar. 5, 2013

(54) METHOD FOR PRODUCING A COMPONENT WITH A LAYER OF TRANSPARENT QUARTZ GLASS

(75) Inventors: Walter Lehmann, Leipzig (DE);
Thomas Kayser, Leipzig (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 325 days.

(21) Appl. No.: 12/927,712

(22) Filed: Nov. 22, 2010

(65) Prior Publication Data
US 2011/0120189 A1    May 26, 2011

(30) Foreign Application Priority Data

Nov. 25, 2009  (DE) .......................... 10 2009 055 631

(51) Int. Cl.
*C03B 19/01* (2006.01)
*C03B 19/09* (2006.01)
*C30B 11/00* (2006.01)
*C30B 15/10* (2006.01)

(52) U.S. Cl. ............. 65/17.3; 65/36; 117/206; 117/208; 264/101; 264/102

(58) Field of Classification Search .......... 65/17.3–17.6, 65/36, 43; 117/13, 206, 208, 213, 215, 220; 264/101, 102
See application file for complete search history.

(56) References Cited

U.S. PATENT DOCUMENTS

| | | | | |
|---|---|---|---|---|
| 3,868,435 A | * | 2/1975 | Daxer et al. | 264/1.21 |
| 5,378,878 A | * | 1/1995 | Revesz | 219/762 |
| 2009/0320521 A1 | | 12/2009 | Lehmann et al. | |

FOREIGN PATENT DOCUMENTS

| | | |
|---|---|---|
| DE | 102 43 953 A1 | 4/2004 |
| DE | 10 2008 030 310 B3 | 6/2009 |

OTHER PUBLICATIONS

Espacenet English language translation of DE 102 43 953 A1 published Apr. 8, 2004.

* cited by examiner

*Primary Examiner* — Jason L. Lazorcik
(74) *Attorney, Agent, or Firm* — Tiajoloff & Kelly LLP

(57) ABSTRACT

In a known method for producing a component with a layer of transparent quartz glass, comprising: applying particles of synthetically produced quartz glass to a base body made of quartz glass and sintering the particles so as to form the quartz glass layer. Starting therefrom, in order to permit a comparatively inexpensive and reproducible production of a component with at least one layer of transparent quartz glass that is distinguished by ultrahigh purity and the absence of bubbles, it is suggested according to the invention that at least part of the $SiO_2$ particles should be present in the form of cylindrical fragments of quartz glass fibers having a mean diameter ranging from 0.1 mm to 3 mm and a mean length ranging from 0.5 mm to 20 mm.

11 Claims, 2 Drawing Sheets

METHOD FOR PRODUCING A COMPONENT WITH A LAYER OF TRANSPARENT QUARTZ GLASS

Figure 1:
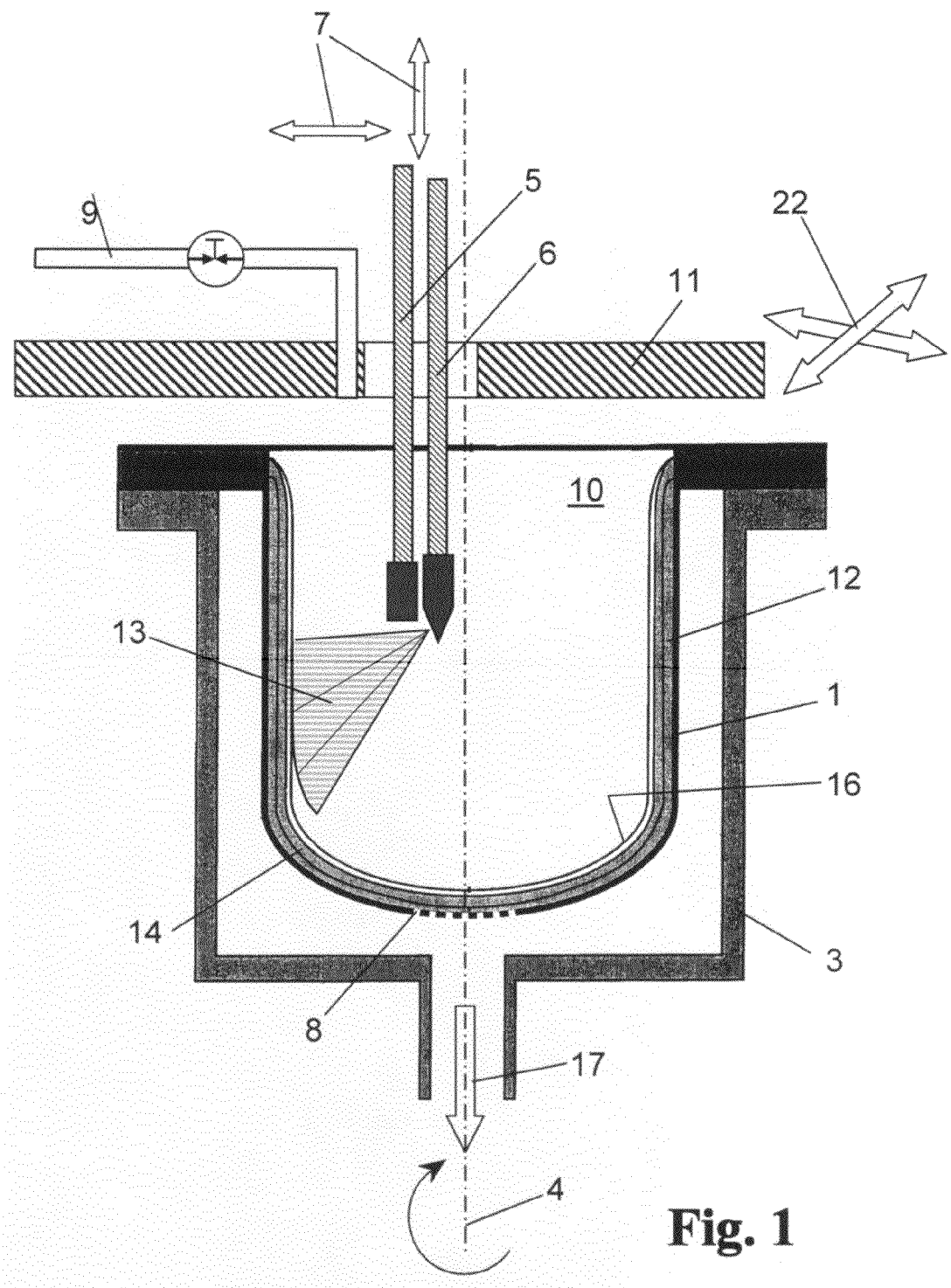

The present invention refers to a method for producing a component with a layer of transparent quartz glass comprising: applying particles of synthetically produced quartz glass to a base body made of quartz glass, and sintering the particles so as to form the quartz glass layer.

To be more specific, the present invention refers to the production of a quartz glass crucible with a transparent inner layer of synthetically produced quartz glass.

Components of quartz glass are used in the form of tubes, rods, plates or blocks as semifinished products or as finished parts in the field of thermotechnical applications which require a good thermal insulation together with a high temperature stability and thermal shock resistance. Reactors, diffusion tubes, heat shields, bell jars, crucibles, nozzles, protective tubes, casting channels or flanges could be indicated by way of example.

Particularly high demands are made on the purity of quartz glass components to be used in particle- and contamination-sensitive applications, such as applications in the semiconductor industry. These are thus often provided with a dense transparent quartz-glass layer that is to prevent impurities from exiting out of the interior of the quartz glass component. The absence of bubbles in the transparent quartz glass layer is important for this function. The reason is that even initially closed bubbles may open during the intended use of the quartz glass component, for instance due to wear of the material layer covering the bubbles or by the bubbles getting inflated and bursting open during the heating of the component, which leads to the exit of impurities or particles and normally terminates the service life of the quartz glass component.

The present invention refers particularly to quartz glass crucibles as are used for receiving the metal melt during the pulling of single crystals according to the so-called Czochralski method. They are normally produced by forming a layer of $SiO_2$ granulation on the inner wall of a melt mold and by heating said layer using an electric arc (plasma) and by sintering the same in this process to obtain the quartz glass crucible. The wall of a quartz glass crucible produced in this way is normally made up of an opaque outer layer which is provided with an inner layer of transparent quartz glass that is without bubbles if possible.

The transparent inner layer is in contact with the silicon melt in the pulling process and is subjected to high mechanical, chemical and thermal loads. Bubbles remaining in the inner layer are growing under the influence of temperature and pressure and may burst in the end, whereby fragments and impurities will pass into the silicon melt, resulting in a lower yield of dislocation-free silicon monocrystal.

To reduce the corrosive attack of the silicon melt and, together with this, to minimize the release of impurities from the crucible wall, the inner layer should therefore be as homogeneous and poor in bubbles as possible.

PRIOR ART

DE 10 2008 030 310 B3 discloses a method of the aforementioned type. In this method a vacuum-type melting mold is used for producing a quartz glass crucible. In this mold, using a molding template, a rotation-symmetrical crucible-like granulation layer of mechanically compacted quartz sand is formed with a layer thickness of about 12 mm, and an inner granulation layer of synthetically produced quartz-glass powder is subsequently formed on the crucible-like granulation layer, also by using a molding template.

The synthetic quartz-glass powder has particles sizes in the range of 50 µm to 120 µm, the mean particle size being about 85 µm. The mean layer thickness of the inner granulation layer is about 12 mm. The granulation layers are sintered from the inside to the outside by generating an electric arc in the interior of the melting mold, so that the finely divided quartz glass powder is first sintered and a dense glass layer is formed.

Sol-gel and granulation methods are known to be used for the production of such a synthetic quartz-glass powder. It is e.g. suggested in DE 102 43 953 A1 that a finely divided synthetic quartz glass powder should be produced by granulating a suspension of pyrogenically produced $SiO_2$ powder, as is obtained in the form of filter dust in quartz-glass production. A suspension is first produced from the loose $SiO_2$ soot dust by addition to water and by homogenization, said suspension is processed by means of a wet granulation method to obtain $SiO_2$ granulate grains, and said grains are sintered after drying and cleaning by heating in a chlorine-containing atmosphere into a dense quartz glass granulation having a mean diameter of 140 µm.

This known method requires a plurality of method steps that partly necessitate a high energy input, e.g. vitrification of the $SiO_2$ granulate grains to obtain the desired quartz-glass granulation. Moreover, homogenization and granulation of the suspension may result in intimate contacts with walls of the tools or grinding bodies, which lead to the entry of impurities and may also yield fragments of a non-uniform and undefined morphology. The method is therefore expensive in terms of costs and may lead to results that are very difficult to reproduce.

TECHNICAL OBJECT

It is thus the object of the present invention to indicate a method that permits a comparatively inexpensive and reproducible production of a component with at least one layer of transparent quartz glass that is distinguished by ultrahigh purity and the absence of bubbles.

Starting from the generic method, this object is achieved in that at least part of the $SiO_2$ particles are present in the form of cylindrical fragments of quartz glass fibers having a mean diameter ranging from 0.1 mm to 3 mm and a mean length ranging from 0.5 mm to 20 mm.

In the method according to the invention, fragments of quartz glass fibers are used as raw material for forming the transparent layer on the base body. Quartz glass fibers can be produced at relatively low costs and with high purity, namely in a reproducible size and with diameters which are in or above the order of typical diameters of synthetically produced quartz glass granulation.

A volume of the fragments that is greater in comparison with synthetically produced $SiO_2$ granulation improves the productivity and economy of the layer generation. The purity of the particles plays an important role during sintering if crystallization of the quartz glass layer and bubble formation are to be prevented.

Moreover, it has surprisingly been found that it is feasible to carry out a dense sintering of quartz-glass fiber fragments collected in layer form so as to obtain a transparent quartz glass already at relatively low sintering temperatures which hardly impair the base body. This is ascribed to the fact that during sintering the fiber-like fragments effect a faster formation of a quartz glass network on the surface to be sintered, which is promoted by the topology of the interspaces between the fiber fragments, the topology being given by the fiber structure. Likewise, the comparatively large "pre-vitrified volume" at lateral dimensions that are nevertheless small, said dimensions being predetermined by the fiber diameter, can facilitate the sintering or melting process.

The mean length of the fragments is at any rate greater than the fiber diameter. The quartz glass fiber fragments are applied to the base body in the form of a $SiO_2$ particle layer and are subsequently sintered on the base body, or the quartz-glass fiber fragments are directly vitrified into the transparent quartz-glass layer while applied to the base body.

This yields transparent quartz glass layers that at a thickness of a few millimeters are distinguished by a reproducible advantageous bubble pattern, i.e. substantially absence of bubbles, and that can be produced with high productivity.

In the case of fiber diameters of less than 0.1 mm, there is no significant advantage over a synthetic quartz-glass granulation in terms of productivity and sintering behavior, and at fiber diameters of more than 3 mm a disadvantageous melting and sintering behavior is observed.

Preferably, quartz-glass fiber fragments are used having a mean diameter of more than 1 mm.

Fiber diameters of less than 1 mm are in the order of the diameters of typical synthetic quartz-glass granulation. With larger diameters of the fiber fragments the productivity gain gets more pronounced due to the larger pre-vitrified volume.

It has turned out to be useful when quartz-glass fiber fragments are used having a mean length of more than 1 mm.

It has been found that the length is less decisive with respect to the absence of bubbles in the layer to be produced than the mean diameter. However, fiber lengths of more than 20 mm make it more difficult to arrange the fibers in a dense packing, and they are therefore not preferred.

Moreover, it has turned out to be advantageous when quartz-glass fiber fragments of a hydrogen-doped quartz glass are used.

Hydrogen is a gas which diffuses in quartz glass relatively easily and is released during heating. When the layer is sintered, the exiting hydrogen displaces other gases which have difficulties in diffusing in quartz glass, and moves them out of interspaces; this is conducive to a bubble-free sintering of the layer.

In this context it has also been found to be useful when the quartz-glass fiber fragments are sintered in a hydrogen-containing atmosphere.

A procedure is preferred in which a $SiO_2$ particle layer consisting of the quartz-glass fiber fragments is produced on the base body with a layer thickness being at least three times the mean fiber fragment diameter.

Depending on the packing density of the fiber fragments existing in the particle layer, the $SiO_2$ particle layer is shrinking during sintering. At an ensuing layer thickness lower than three times the mean fiber-fragment diameter, irregularities and other inhomogeneities, particularly also bubbles, manifest themselves after the $SiO_2$ particle layer has been sintered: This is attributed to the fact that only a few layers contribute to the formation of the network on the surface of the layer.

With respect to a high purity of the quartz glass layer it has turned out to be useful when quartz-glass fiber fragments are produced in that a fiber is drawn from a preform and said fiber is comminuted.

The drawing of the fiber from a preform is carried out without any tools in the sense that there is no contact with tools in the softened region (the drawing bubble)—in contrast e.g. to the drawing of a quartz glass melt from a drawing nozzle. This contact-free drawing operation prevents impurities on the fiber surface. The drawn fiber is comminuted during the drawing process or subsequently into fiber fragments that for the above-mentioned reasons are distinguished by a particularly high purity and that ideally do not call for any subsequent cleaning treatment for removing metallic impurities. This yields a high-purity starting material in the form of quartz-glass fiber fragments for the formation of the quartz glass layer. Preferably, a solid cylinder or a hollow cylinder of synthetic quartz glass is used as the preform.

In the case of a hollow cylinder the inner bore is completely collapsed during the fiber drawing process to avoid the formation of closed cavities during sintering. The quartz glass of the preform is usually undoped; however, it may also contain dopants, particularly those that reduce the viscosity of the quartz glass, resulting in an easier sintering at a low temperature.

In a particularly preferred variant it is intended that a base body of quartz glass of naturally occurring raw material is produced and provided with the transparent quartz-glass layer.

Here, the transparent inner layer serves as a diffusion barrier against potential impurities contained in the quartz glass of the base body, and it can improve the surface quality of the base body.

Preferably, the quartz glass layer is produced as an inner coating of a crucible-like base body in that a layer of the $SiO_2$ particles is sintered by applying a negative pressure.

The quartz glass layer serves as a transparent inner layer of a quartz glass crucible as is e.g. used for pulling a silicon monocrystal. For the formation of the inner layer a particle layer of quartz-glass fiber fragments is formed on the inner wall of an evacuable melting mold. During sintering of the layer from the inside to the outside, a vacuum is applied from the outside. The fiber-like topology of the fragments plays a special role during the sintering or melting process. As long as the particle layer is porous, the vacuum is also operative in the interior of the melting mold so that it can only develop its full impact if a closed inner skin has formed on the particle layer. In the remaining porous layer region the quartz glass fibers will then form a fiber skeleton having cavities running therethrough, which skeleton will withstand the action of negative pressure and temperature for a comparatively long period of time, which contributes to an effecient evacuation of gases out of the cavities.

The inner layer produced by virtue of the method according to the invention on the base body is distinguished by a high purity and a low degree of bubbles and it can be produced in a reproducible and economic manner also in the case of great layer thicknesses.

Preferably, quartz-glass fiber fragments are used having a diameter differing from a nominal diameter by not more than 10%.

Quartz-glass fiber fragments with a uniform diameter show a similar melting behavior. When fiber fragments are used for forming the quartz glass layers as an inner coating of a crucible-like base body, the above-mentioned fiber skeleton cavities are maintained for a longer period of time than in the case of a fiber skeleton in which cavities between rather thick fiber fragments are partly filled with rather thin fiber fragments.

PREFERRED EMBODIMENTS

The invention shall now be explained in more detail with reference to embodiments and a drawing. Shown is in detail in FIG. 1 in a schematic illustration, a melting device for producing a quartz glass crucible with a transparent inner layer produced by using quartz-glass fiber fragments, with the help of a first method variant; and FIG. 2 in a schematic illustration, a melting device for producing a quartz glass crucible with a transparent inner layer produced by using quartz-glass fiber fragments, with the help of a second method variant.

The melting apparatus according to FIG. 1 comprises a melting mold 1 of metal having an inner diameter of 75 cm, which with an outer flange rests on a carrier 3. The carrier 3 is rotatable about the central axis 4. A cathode 5 and an anode 6 (electrodes 5; 6) of graphite, which as outlined by way of the directional arrows 7 are movable within the melting mold 1 in all spatial directions, project into the interior 10 of the melting mold 1.

The open upper side of the melting mold 1 is partly covered by a heat shield 11 in the form of a water-cooled metal plate with a central through hole through which the electrodes 5, 6 project into the melting mold 1. The heat shield 11 is connected to a gas inlet 9 for hydrogen (alternatively also for the supply of helium). The heat shield 11 is horizontally movable (in x- and y-direction) in the plane above the melting mold 1, as outlined by the directional arrows 22.

The space between carrier 3 and melting mold 1 is evacuable by means of a vacuum device that is represented by the directional arrow 17. The melting mold 1 comprises a plurality of passages 8 (these are illustrated in FIG. 1 only by way of a symbol in the bottom area), via which the vacuum 17 applied to the outside of the mold 1 can become operative inwards.

The manufacture of a 28" quartz glass crucible with a transparent inner layer shall now be described in more detail with reference of an embodiment.

In a first method step crystalline granulation of natural quartz sand purified by means of hot chlorination, with a grain size ranging from 90 μm to 315 μm, is filled into the melting mold 1 which is rotating about its longitudinal axis 4. Under the action of the centrifugal force and with the help of a molding template a rotation-symmetrical crucible-like granulation layer 12 of mechanically compacted quartz sand is formed on the inner wall of the melting mold 1. The mean layer thickness of the granulation layer 12 is about 12 mm.

In a second method step an inner granulation layer 14 of synthetically produced quartz glass powder is formed on the inner wall of the quartz sand layer 12 also by using a molding template and under continued rotation of the melting mold 1. The synthetic quartz glass powder consists of quartz-glass fiber fragments having a uniform diameter of 500 μm and a mean length of 10 mm. They are obtained in that a cylinder of pure undoped quartz glass is drawn into a bubble-free fiber and said fiber is comminuted by means of a so-called chopper into fiber fragments.

The mean layer thickness of the inner granulation layer 14 is also about 12 mm.

For vitrifying the $SiO_2$ granulation layers 12, 14 the heat shield 11 is positioned above the opening of the melting mold 1 and hydrogen is introduced via the inlet 9 into the crucible interior 10. The electrodes 5; 6 are introduced through the central opening of the heat shield 11 into the interior 10, and an arc, which in FIG. 1 is marked by the plasma zone 13 (shown against a gray background in FIG. 2), is ignited between the electrodes 5; 6. At the same time vacuum is applied to the outside of the melting mold 1.

The electrodes 5; 6 are moved together with the heat shield 11 into the lateral position shown in FIG. 1 and are acted upon with a power of 600 kW (300 V, 2000 A) so as to vitrify the granulation layers 12; 125 in the area of the side wall. The plasma zone 13 is slowly moved downwards and the quartz glass powder of the inner granulation layer 14 is melted continuously and in portions to obtain a bubble-free inner layer 16. To vitrify the granulation layers 12; 14 in the area of the bottom, heat shield 11 and electrodes 5; 6 are moved into a central position and the electrodes 5; 6 are lowered downwards.

During sintering of the layer a dense inner skin is first of all formed. Thereupon the applied negative pressure (vacuum) can be raised, so that the vacuum can develop its full effect. The uniform thickness of the fiber fragments has the effect that in the remaining porous layer region these fragments form a fiber skeleton, which has cavities running therethrough, with comparatively large cavities that are not filled with other fiber material and that withstand the impacts of negative pressure and temperature for a comparatively long time, which contributes to an efficient evacuation of gases out of the cavities.

The melting process will be finished before the melting front reaches the inner wall of the melting mold 1. The transparent inner layer 16 is smooth, hardly shows bubbles and has a mean thickness of about 8 mm.

Figure 2:
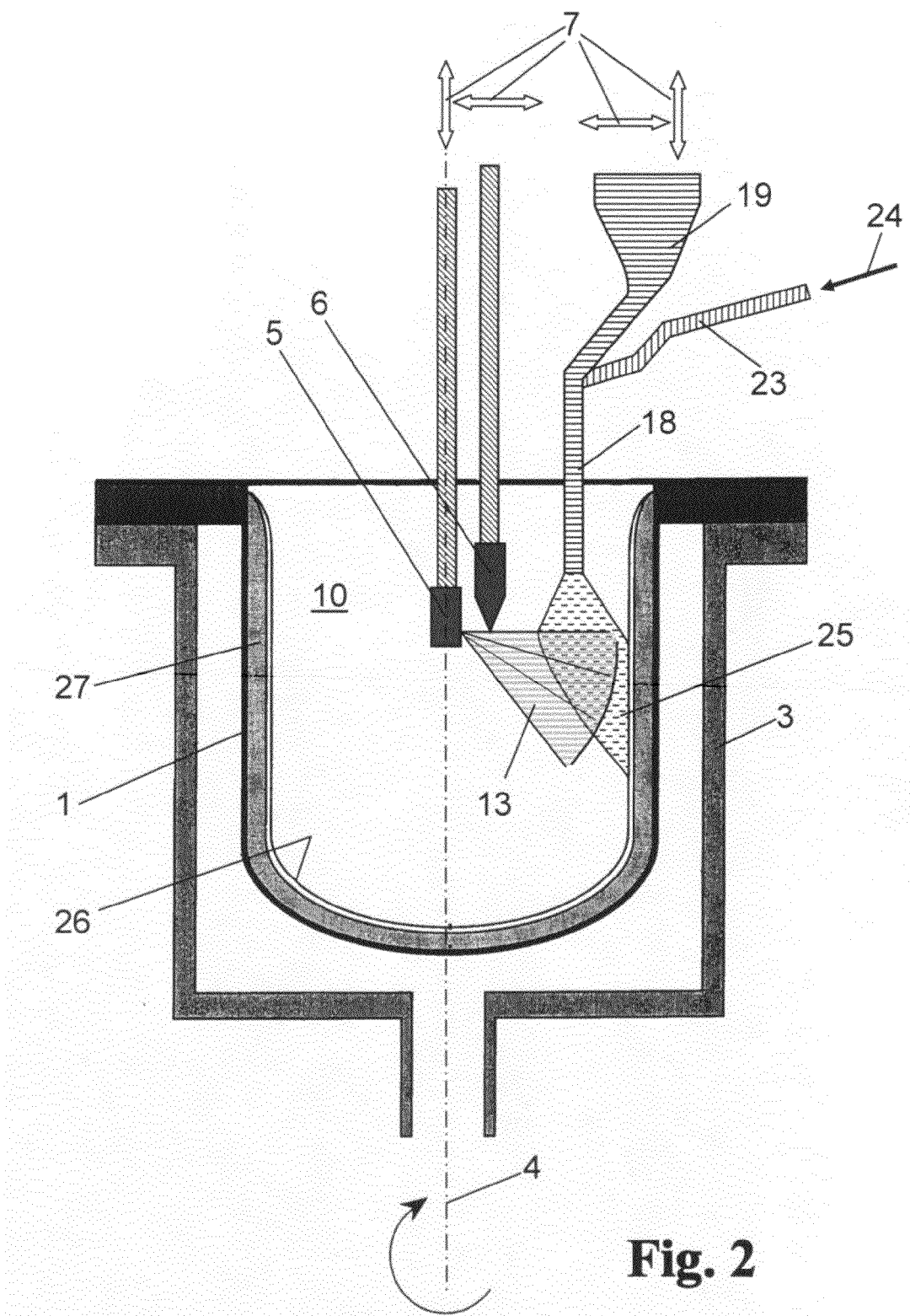

A modification of this procedure shall be explained hereinafter with reference to the melting apparatus schematically shown in FIG. 2. Whenever FIG. 2 uses the same reference numerals as those in FIG. 1, constructionally identical or equivalent components and constituents shall thereby be designated as explained above in more detail with reference to the figure.

The melting apparatus includes a feed tube 18 that is movable in all spatial directions (directional arrows 7), the feed tube projecting into the interior of the melting mold 1 and being connected to a reservoir 19. The feed tube 18 is provided with a Y-tube 23 for the supply of compressed air, as symbolized by the directional arrow 24.

The reservoir 19 is filled with fiber fragments 25 of pure, synthetically produced, hydrogen-doped quartz glass. The fiber fragments have a uniform diameter of 1.5 mm and a mean length of about 10 mm. They are obtained by drawing a cylinder of pure undoped quartz glass into a bubble-free fiber and by crushing said fiber by means of a chopper into fragments. The fiber fragments 25 are subsequently loaded with hydrogen in that they are treated in a hydrogen atmosphere at a temperature of 800° C. for a period of time of 5 h.

For the manufacture of the quartz glass crucible an outer granulation layer of crystalline granulation of naturally occurring quartz, which was purified by means of hot chlorination before, is first formed, as has been described with reference to FIG. 1.

Subsequently, a transparent and low-bubble inner layer 26 is formed on the inner wall of the outer granulation layer by means of the "arc feeding method". To this end, with continued rotation of the melting mold 1, the high-purity quartz-glass fiber fragments 25 are blown into the crucible interior 10 via the feed tube 18 and with supply of compressed air 24. At the same time the plasma 13 (arc) is ignited between cathode 5 and anode 6.

The fed quartz-glass fiber fragments 25 pass into the plasma zone 13, they are softened therein and flung by means of the pressure generated by the arc against the inner wall of the outer granulation layer and fused thereon with formation of the inner layer 26 of transparent quartz glass. A maximum temperature of more than 2100° C. is reached in the area of the inner wall, so that the outer granulation layer is sintered into an outer layer 27 of opaque quartz glass.

The inner layer 26 of the quartz glass crucible produced in this way has a mean thickness of 2.5 mm. It is smooth, hardly shows bubbles and is firmly connected to the outer layer 27 of opaque quartz glass.

The invention claimed is:

1. A method for producing a quartz glass crucible with an inner layer of transparent quartz glass, said method comprising:
    applying $SiO_2$ particles of synthetically produced quartz glass to a crucible shaped base body made of quartz glass;
    sintering the $SiO_2$ particles so as to form the transparent quartz glass inner layer; and
    wherein the $SiO_2$ particles are cylindrical fragments of quartz glass fibers having a mean diameter ranging from 0.1 mm to 3 mm and a mean length ranging from 0.5 mm to 20 mm.

2. The method according to claim 1, wherein the quartz-glass fiber fragments have a mean diameter of more than 1 mm.

3. The method according to claim 1, wherein the quartz glass fiber fragments have a mean length of more than 1 mm.

4. The method according to claim 1, wherein the quartz-glass fiber fragments are of a hydrogen-doped quartz glass.

5. The method according to claim 1, wherein the sintering is performed in a hydrogen-containing atmosphere.

6. The method according to claim 1, wherein the SiO2 particles are applied on the base body so as to form an applied layer having a layer thickness being at least three times the mean diameter of the quartz glass fiber fragments.

7. The method according to claim 1, wherein the quartz-glass fiber fragments are produced by drawing a fiber from a preform and comminuting said fiber.

8. The method according to claim 7, wherein the preform is a solid cylinder or a hollow cylinder of synthetic quartz glass.

9. The method according to claim 1, wherein the base body of quartz glass is produced from naturally occurring raw material and then provided with the transparent quartz-glass layer.

10. The method according to claim 9, wherein the sintering including sintering of the inner layer of the $SiO_2$ particles while applying a negative pressure.

11. The method according to claim 1, wherein the quartz-glass fiber fragments have a diameter differing from a nominal diameter by not more than 10%.

* * * * *